April 8, 1969 C. RAUCH 3,437,893

BUFFER AMPLIFIER SYSTEM WITH THREE MATCHED AMPLIFIER CHANNELS TO PROVIDE SYMMETRICALLY BALANCED INPUT AND OUTPUT IMPEDANCE

Filed May 3, 1966

INVENTOR.
Charles Rauch
BY
S. A. Giarratana &
F. L. Masselle
ATTORNEYS

United States Patent Office 3,437,893
Patented Apr. 8, 1969

3,437,893
BUFFER AMPLIFIER SYSTEM WITH THREE MATCHED AMPLIFIER CHANNELS TO PROVIDE SYMMETRICALLY BALANCED INPUT AND OUTPUT IMPEDANCE

Charles Rauch, Sherman Oaks, Calif., assignor to Singer-General Precision, Inc., a corporation of Delaware Filed May 3, 1966, Ser. No. 547,222
Int. Cl. G05b 6/02
U.S. Cl. 318—18 6 Claims

ABSTRACT OF THE DISCLOSURE

A buffer amplifier system is provided which employs three matched amplifier channels to provide symmetrically balanced input and output impedance; D.C. feedback is used to reduce bias saturation of the transformers. Each channel is directly connected to one input winding of the synchro transmitter and the signal thereon is amplified, thus eliminating the need for grounding one of the synchro transmitter leads.

The present invention relates to amplifier systems and more specifically to a high impedance buffer amplifier capable of reproducing line-to-line synchro signals which will drive a torque receiver coupled to a dial and pointer assembly.

Previously, line-to-line synchro signals were amplified by means of two completely separate channels of an amplifier whose power stages operated in a Class B push-pull manner. These two channels had a common connection at both the input and output stages. The system required that one of the synchro transmitter output leads be grounded and the two amplifier channels were connected to amplify the signal voltage between the grounded lead and the other two output leads of the synchro transmitter. This system of the prior art presented a number of disadvantages. The grounding of one of the synchro transmitter leads resulted in large input signal errors due to the unbalance of the transmission line. Non-symmetrical loading of both the transmission line and the synchro transmitter also produced errors. In addition the non-symmetrical output impedance of the amplifier caused oscillations in the synchro receiver when a step input signal was applied. A further problem was that the synchro receiver often stalled or "hung up" because of D.C. saturation of the transformers in the two amplifier system.

The buffer amplifier system of the present invention eliminates the disadvantages of the two channel amplifier system. Three matched amplifier channels are used to provide symmetrically balanced input and output impedance and D.C. feedback is used to greatly reduce bias saturation of the transformers.

Each channel is connected directly to one input winding of the synchro transmitter and the signal thereon is amplified thus eliminating the need for grounding one of the synchro transmitter leads.

Among the objects of the present invention are the provision of a three channel amplifier unit to drive a synchro receiver in accordance with signals from a signal transmitter; to provide an amplifier for use with a synchro signal system having symmetrical impedance characteristics; and to provide an amplification system having identical impedance from any of three inputs to ground.

Other objects and further scope of applicability of the present invention will become apparent from the detailed description to follow, taken in conjunction with the accompanying drawings in which.

Figures 1, 2:
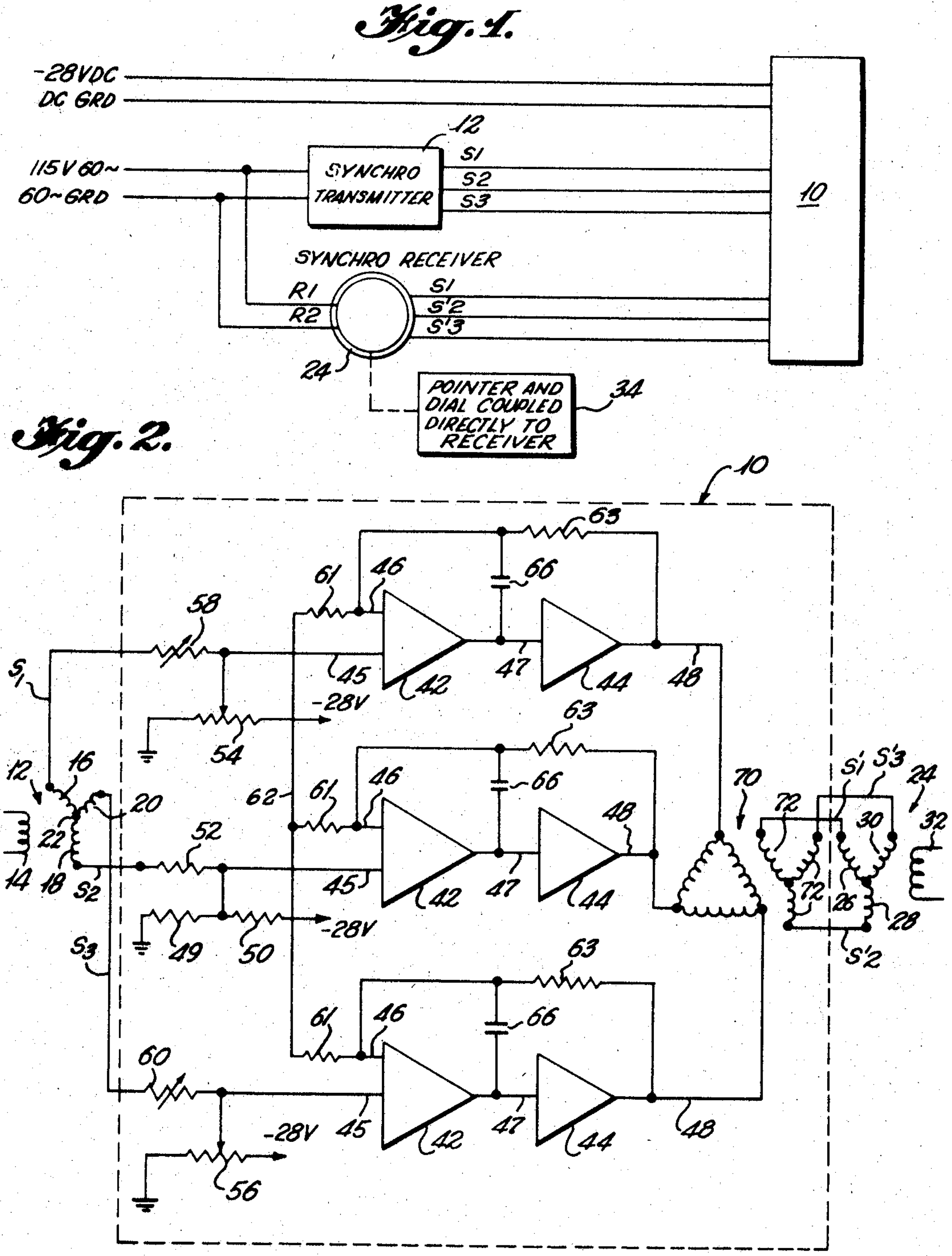
FIG. 1 is a block diagram of the present system.
FIG. 2 is a more detailed diagram of the system of FIG. 1.

As shown in FIG. 1 the amplifier buffer unit 10 of the present invention is shown coupled to a synchro transmitter 12, which receives input signals from a 115 voltage A.C. supply source. As shown in FIG. 2 the synchro transmitter 12 includes a rotor having a single phase winding 14 electrically connected to the A.C. supply source. The synchro transmitter 12 has a stator having three windings 16, 18 and 20, connected together in a Y relation. The common connection of the three windings is designated by the reference number 22. Each of the windings 16, 18 and 20 feeds a signal to the amplifier buffer unit 10 through lines $S_1$, $S_2$, $S_3$. The output of the amplifier buffer unit 10 is connected to a synchro torque receiver 24 over lines $S_1'$, $S_2'$ and $S_3'$. The synchro torque receiver 24 also includes three Y connected stator windings 26, 28 and 30 designed to receive the signals generated by the synchro transmitter 12 and a rotor winding 32 connected to the A.C. supply source. A pointer and dial assembly 34 is driven directly by the torque receiver 24 to indicate the position of the transmitter rotor.

As shown in FIG. 2 the amplifier buffer unit is comprised of three amplification channels each of which comprises a preamplifier 42 and a power amplifier 44. Each stator winding of the synchro transmitter 12 is connected to a different amplification channel. The amplifier chanels are symmetrical and preamplifiers 42 and power amplifiers 44 have the same electrical characteristics. Each of the preamplifiers 42 has two input leads 45 and 46 and amplifies the voltage applied between these two input leads. The amplified output voltage of each preamplifier is produced on an output lead 47, which applies the amplified voltage to the input of the corresponding power amplifier 44. Each power amplifier 44 is essentially an emitter follower with a gain of about unity and produces its output voltage on an output lead 48.

A pair of resistors 49 and 50 are connected in series between a source of —28 volts and ground and the junction betwen the resistors 49 and 50 is connected to the input lead 45 of the middle preamplifier 42 to provide a bias voltage to this input lead. The output lead $S_2$ of the transmitter 12 is connected to the input lead 45 through a resistor 52. Potentiometers 54 and 56 are connected between —28 volts and ground and the movable taps of these potentiometers are connected to the input leads 45 of the remaining two preamplifiers 42 to provide the proper bias to these preamplifiers. Variable resistors 58 and 60 connect the output leads $S_1$ and $S_3$ of the transmitter 12 to the input leads 45 of the remaining two preamplifiers 42. The movable taps of the potentiometers 54 and 56 and the values of the variable resistors 58 and 60 are preset during the manufacture of the buffer amplifier to balance the three channels in a manner to be described below. Once these circuit elements have been preset they do not have to be readjusted.

The input lead 46 of each of the preamplifiers 42 is connected through a resistor 61 to a conductor 62 common to all three preamplifiers 42. A feedback resistor 63 is connected between the output lead 45 of each power amplifier 44 and the input lead 46 of the corresponding preamplifier 42 to provide negative feedback in each amplification channel. A capacitor 66 is connected between each preamplifier output lead 47 and input lead 46 to stabilize the channel from oscillations caused by the high inductive load on the amplifier.

In response to the rotor winding 14 being energized from the AC supply source, voltages are generated by the three stator windings 16, 18 and 20 on output leads $S_1$, $S_2$ and $S_3$. These voltages are in phase and vary only in magnitude with the position of the rotor winding 14 with respect to the three stator windings 16, 18 and 20 which are angularly spaced 120° apart. The signal voltage produced on each output lead $S_1$, $S_2$ and $S_3$ is with respect to the common connection 22 of the three stator windings 16, 18 and 20.

The voltage signals are amplified by the amplifier buffer unit 10 and applied to the stator windings 26, 28 and 30 of the synchro receiver 24 which produces a resultant unidirectional field corresponding to the angular position of the rotor winding 14 of the synchro transmitter 12, which field reacts with the field of the rotor winding 32 of the synchro receiver 24 causing it to assume an angular position with respect to the stator windings 26, 28 and 30 corresponding to the angular position of the rotor winding 14 with respect to the stator windings 16, 18 and 20 of the synchro transmitter 12. The rotor of the receiver drives the pointer and dial assembly 34, which indicates a position on its dial scale.

In synchro transmitters normally no output lead is provided from the common connection joining the stator windings. For this reason the output voltages produced by the windings 16, 18 and 20 cannot be connected directly across the input leads 45 and 46 of the preamplifiers. The conductor 62 by virtue of the connection through the resistors 61 and 63 averages the signal voltages produced by the power amplifiers 44 on output leads 48 so that the lead 62 simulates the common connection point 22 in the synchro transmitter 12. Accordingly, the amplification channels effectively amplify the three signal voltages produced on output leads $S_1$, $S_2$ and $S_3$ by the transmitter 12 so that these signal voltages are accurately reproduced on output leads 48.

The conductor 62 will properly simulate common point 22 only if the three channels of amplification are properly balanced. To achieve the proper balance the values of the resistor 58 and 60 and the movable taps of the potentiometers 54 and 56 are adjusted until substantially no current flows in the conductor 62 for all positions of the rotor of the transmitter 12.

The output leads 48 are connected to the junction points of three delta connected primary windings 68 of a transformer 70. The transformer 70 has three Y connected secondary windings 72, each of which is inductively coupled to a different one of the primary windings 68. The secondary windings 72 are connected to the leads $S'_1$, $S_2'$ and $S_3'$, which connects to the stator windings 26, 28 and 30 of the receiver 24. With this arrangement the rotor of the receiver 24 will be driven to a position corresponding to the position of the rotor of the transmitter 12.

It will be appreciated that the above description is illustrative only and not limiting and many modifications may be made to the specific embodiment described above without departing from the spirit and scope of the invention, which is defined in the appended claims.

What is claimed is:

1. In a synchro system comprising a synchro transmitter with a transmitter rotor including an ungrounded three winding output, each winding being operable to generate a signal, and amplification means for amplifying the signals generated by said windings including three balanced amplification channels, each channel having a plurality of input sides, a synchro receiver with a receiver rotor, connected to receive the amplified output signals of said amplification means so said receiver will position its receiver rotor to correspond with the position of the transmitter rotor, each of said channels being operable to amplify the ungrounded signal generated by one of said windings of said transmitter, the improvement therein, wherein said amplification means includes means to average the voltages from corresponding points in said three channels and apply the resulting average voltage to one input side of each of said amplification channels and means to apply the output signals of said transmitter severally to the other input sides of said amplification channels.

2. A synchro system as recited in claim 1 wherein said corresponding points from which the voltages are averaged by said averaging means are the outputs of said amplification channels.

3. A synchro system as recited in claim 1 wherein said averaging means includes means to provide negative feedback in each of said channels.

4. A synchro system as recited in claim 3 wherein said averaging means comprises a resistor connected from the output of each amplification channel to said one side of the input of such channel and a resistor connecting said one side of each channel to a common conductor.

5. A synchro system as recited in claim 4 wherein said amplification channels are balanced so that substantially no current flows in said common conductor.

6. A synchro system as recited in claim 1 wherein said averaging means comprises a conductor resistively connected to said corresponding points of said amplification channels, said amplification channels being balanced so that substantially no current flows in said common conductor.

References Cited

UNITED STATES PATENTS

| | | | |
|---|---|---|---|
| 2,296,436 | 9/1942 | Goddard | 318—23.5 |
| 2,356,186 | 8/1944 | Somers | 318—23.5 |
| 2,466,687 | 4/1949 | Craddock et al. | 318—23.5 |
| 2,533,262 | 12/1950 | Jenks | 318—23.5 XR |
| 2,632,136 | 3/1953 | Schmitt | 318—23.5 |

BENJAMIN DOBECK, *Primary Examiner.*

U.S. Cl. X.R.

318—23.5, 24